July 17, 1934.   R. C. NAYLOR   1,966,677
BALL BEARING
Filed Nov. 1, 1932
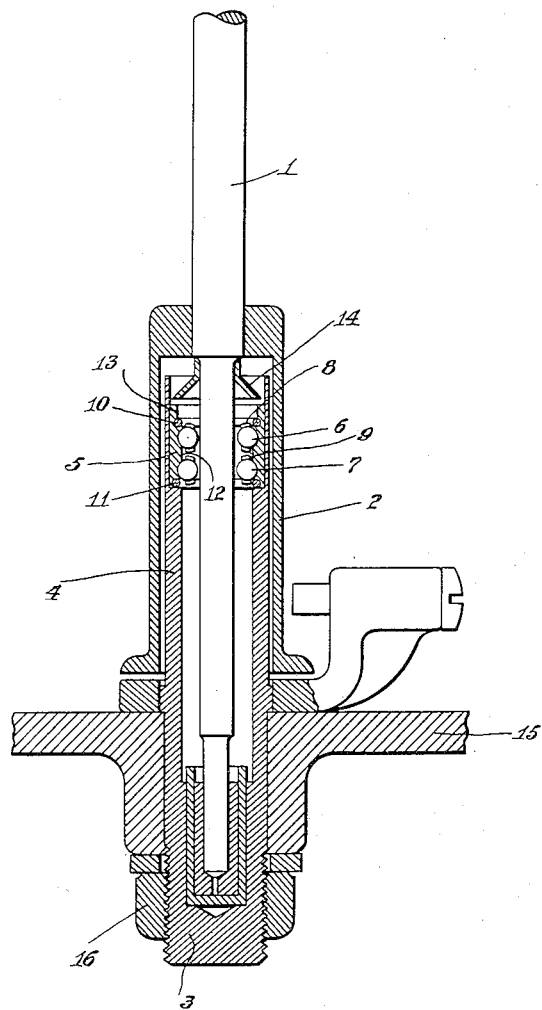
Roger Clement Naylor
INVENTOR
BY
ATTORNEY Patented July 17, 1934

UNITED STATES PATENT OFFICE 1,966,677

BALL BEARING

Roger Clement Naylor, Poughkeepsie, N. Y., assignor to The Federal Bearings Company, Inc., Poughkeepsie, N. Y., a corporation of New York Application November 1, 1932, Serial No. 640,581

4 Claims. (Cl. 308—228)

This invention relates to new and useful improvements in ball bearings.

It is the object of the present invention to provide a ball bearing structure for use in places so restricted that the rotating shaft must serve as the inside cone or race-way and yet the bearing can be handled as a fully assembled, unitary structure.

With this object in view I provide a structure the details of which will be described in the following specification and defined in the appended claims.

The drawing represents in vertical cross section a spindle bearing embodying the present invention.

1 is a spindle rotatable by means of a belt pulley 2. The end of the spindle is journalled in a bearing block 3 seated in frame 15 and held in place by means of a nut 16. A sleeve 4 projects from the block 3 within the pulley 2 around spindle 1. Within the recessed end of sleeve 4 is seated a double row ball bearing for the spindle consisting of the following parts:

An outer ring or race 5 having two grooves for the two rows of balls 6 and 7. The balls are held in place by means of the usual spacers 8 and 9. There is no inner raceway or cone and the balls contact direct with the spindle. In order to retain the balls in position within the race, snap rings 10 and 11 are provided in grooves near the ends of the race, and the diameter of the bore between the two rows of balls is reduced, as indicated at 12. The outer ends of the ring 5 must be bored large enough to clear the spacers 8 and 9, and if the same bore were continued through the ring 5, there would be nothing to prevent either spacer getting out of place prior to its application to the spindle. The present bearing can be handled as a compact assembly unit although it has no inner raceway.

If a spindle like 1 is rotated at high speeds, it is likely to wear at the points of ball contact even where it is made of chrome carbon steel. The raceway is guarded against such wear by the provision of the grooves which contact with the balls over a considerable area. In many cases it is commercially impracticable to provide such grooves in spindles of existing machines. If after prolonged use, the balls wear grooves in the spindle and the developing looseness induces vibration then, instead of replacing the spindle by a new one, the ball bearing unit is simply removed and replaced in a reversed position. In this position, owing to the provision of a lip 13 on the raceway 5 on which the ball bearing unit is now seated in sleeve 4, the balls 6 and 7 contact with the spindle 1 at higher points which are still in their original condition.

A similar result could be obtained by making the bearing symmetrical and inserting a washer under its lower end to raise it up.

A guard 14 on spindle 1 limits the vertical displacement of the ball bearing unit.

I am aware that roller bearings have been provided for similar purposes. However, their use is limited to relatively low-speed machines.

What is claimed is:

1. In a ball bearing, two rows of balls, each held in a spacer ring against movement with respect to one another but allowing each ball freely to rotate, an outer raceway the ends of which have a diameter sufficiently large to permit passage of said rings and constituting with the spacer ring the only parts of the ball bearing contacting with the balls, a spindle having an even surface passing through the center of said ball bearing and contacting with said balls, means cooperating with the ends of the raceway to hold the rings within said raceway, two tracks in said raceway for said balls, and a projection restricting the inside diameter of said raceway between said tracks.

2. In a ball bearing, a row of balls, a spacer ring for holding said balls against movement with respect to one another but allowing each ball freely to rotate, an outer raceway having a grooved track for said balls and constituting with the spacer ring the only parts of the ball bearing contacting wth the balls, a spindle having an even surface passing through the center of said ball bearing and contacting with said balls, means on said raceway for holding the spacer ring in place, and a lip projecting from said raceway beyond said means.

3. In combination, a spindle, a ball bearing having an outer raceway and balls contacting with said spindle in one line, a spacer ring for holding said balls against movement with respect to one another but allowing each ball freely to rotate, said balls contacting only with said raceway, ring and spindle, a stationary seat for said outer raceway, and means for changing the seating of said raceway to contact the balls with said spindle in a different line.

4. In combination, a spindle, a sleeve surrounding said spindle, a ball bearing seated in said sleeve and having two rows of balls contacting with said spindle, a spacer ring for holding each row of balls against movement with respect to one another but allowing each ball freely to rotate, an outer raceway having two grooved tracks for said balls, said balls contacting only with the rings, the tracks and the spindle, a projection in said raceway between said tracks restricting the inside diameter of said raceway so as to prevent passage of the spacer rings, snap rings near the ends of the raceway to hold the spacer rings within the raceway, and a lip projecting from one end of said raceway.

ROGER CLEMENT NAYLOR.